United States Patent
Pretzer et al.

(10) Patent No.: US 7,161,615 B2
(45) Date of Patent: Jan. 9, 2007

(54) SYSTEM AND METHOD FOR TRACKING OBJECTS AND OBSCURING FIELDS OF VIEW UNDER VIDEO SURVEILLANCE

(75) Inventors: John D. Pretzer, Clovis, CA (US); Robert D. Sexton, Fresno, CA (US); Reford R. Still, Fresno, CA (US); John C. Ellenberger, Clovis, CA (US)

(73) Assignee: Pelco, Clovis, CA (US)

( * ) Notice: Subject to any disclaimer, the term of this patent is extended or adjusted under 35 U.S.C. 154(b) by 731 days.

(21) Appl. No.: 10/298,783

(22) Filed: Nov. 18, 2002

(65) Prior Publication Data

US 2003/0103139 A1 Jun. 5, 2003

Related U.S. Application Data

(60) Provisional application No. 60/334,637, filed on Nov. 30, 2001.

(51) Int. Cl.
*H04N 7/18* (2006.01)
*G06K 9/20* (2006.01)

(52) U.S. Cl. ..................................... 348/143; 382/283
(58) Field of Classification Search .............. 348/143, 348/151–152, 155, 170, 164; 382/103, 107, 382/283
See application file for complete search history.

(56) References Cited

U.S. PATENT DOCUMENTS

| | | | | |
|---|---|---|---|---|
| 5,243,418 A | * | 9/1993 | Kuno et al. | 348/155 |
| 6,469,734 B1 | * | 10/2002 | Nichani et al. | 348/152 |
| 6,509,926 B1 | * | 1/2003 | Mills et al. | 348/143 |
| 6,727,938 B1 | * | 4/2004 | Randall | 348/143 |

* cited by examiner

*Primary Examiner*—Gims Philippe
(74) *Attorney, Agent, or Firm*—Gunster, Yoakley & Stewart, P.A.

(57) ABSTRACT

A system and method is provided for processing video signals, tracking objects in view, and blanking fields of view in video surveillance systems. The system includes a camera having two rotational degrees of freedom, a display, and a combination of switches for routing the video signal. The displayed video signal is divided into an array of cells which may be individually masked, blanked, or blurred. The camera microcontroller captures and stores objects in view, and tracks such objects as the camera zooms, pans and tilts in spherical coordinates. Objects in view may be tracked and blanked by obscuring an agglomeration of the cells in response to a masking signal generated by the microcontroller.

21 Claims, 7 Drawing Sheets

SYSTEM AND METHOD FOR TRACKING OBJECTS AND OBSCURING FIELDS OF VIEW UNDER VIDEO SURVEILLANCE

CROSS-REFERENCE TO RELATED APPLICATION

This application is related to and claims priority to U.S. Provisional Application Ser. No. 60/334,637, filed Nov. 30, 2001, entitled REMOTELY OPERATED CAMERA SYSTEM, the entirety of which is incorporated herein by reference.

STATEMENT REGARDING FEDERALLY SPONSORED RESEARCH OR DEVELOPMENT n/a

FIELD OF THE INVENTION

The present invention relates to video systems, and, in particular, to a method and system for processing video signals, tracking objects in view, and blanking fields of view in video surveillance systems.

BACKGROUND OF THE INVENTION

In some video surveillance applications, there exists a need to "blank out" areas of a scene to prevent viewing of objects within these areas. The most basic version of this masking function is known as "window blanking." The purpose of window blanking is to allow a surveillance system administrator to mask out specific objects within camera viewing areas. That is, objects within these areas cannot be seen on system monitors by surveillance system operators. This feature is desired in applications where privacy is necessary in the scene (e.g. masking of apartment and hotel windows). The number, shape and size of blanking areas that can be set up are dependent upon the specific system.

In window blanking, a rectangular area of a field of view on a monitor or display, commonly referred to as a "window", is specified by the system. The video signal routed to the monitor or display is then blocked or shielded from view on a portion of the display monitor corresponding to such window. Thus, a window in a particular field of view may be masked or "blanked." In known surveillance camera systems that provide a basic window blanking function, masked areas remain fixed relative to the scene. If a controllable camera is moved (panned and/or tilted), the masked areas will also move when viewed on a monitor. Likewise, if there is a masked area in the camera view and the camera lens is controlled to zoom in telephoto, the blanked areas will become larger (or smaller when zooming out wide). In all the above scenarios, all objects within the masked areas can never be seen by surveillance system operators, regardless of pan, tilt and zoom position.

However, one drawback of known window blanking systems is that the blanking window must be specified for a particular scene or view, taken or viewed at a particular zoom setting or magnification. This requires a user to first navigate the camera settings to adjust the view to exactly the point where blanking is to occur, and then set and activate the blanking feature. It is desirable to instead allow the general surveillance landscape to be viewed at any camera setting, and at any zoom setting, when deciding and indicating an object in view to be blanked. It is further desirable to specify the blanking window relative to such object, including a specific zoom setting range wherein blanking would be active. As such, it is desirable to provide a system and method of video surveillance which incorporates all of the foregoing features.

Another problem with window blanking occurs when the motion of a typical pan and tilt camera is added to the functionality of the surveillance system. The basic window blanking feature is practical when no rotation of the viewing apparatus is possible. The specified window simply changes overall size given the particular zoom magnification entered into the system. Very little distortion occurs to the objects tracked by the blanking window. However, once rotation is added, and especially if a two degree of freedom pan and tilt camera is used, the objects cannot be easily tracked for blanking due to spherical distortion. To correct for such spherical distortion, it is desirable to provide a system and method of video surveillance which allows for the effective tracking and blanking of objects in a field of view for a pan and tilt camera system.

Finally, another problem with known window blanking systems is that the particular masking object used are either solid, completely masked, or consist of white, black or grayscale blocks. The masking object does not allow a viewer to discern any information about the window blanked by such masking object. Oftentimes however, although privacy is still required for a particular viewing area, some basic information is still desirable, for example, a system which allows detection of movement within a blanked area without revealing details within a scene. As a specific example, in a retail store, it may be desirable to monitor individuals entering and/or leaving a fitting room or restroom. It is desirable therefore, to provide a method and system for video surveillance wherein movement is detectable within a particular blanking area of a field of view, without revealing a threshold level of detail in such area.

SUMMARY OF THE INVENTION

The present invention advantageously provides a method and system for masking an object on a display.

According to an aspect, the present invention provides a video surveillance system for masking an object on a display having a controller which includes a memory and a processor electrically coupled to the memory. The memory stores a first display coordinates data for the object. The processor converts the first display coordinates data to a second display coordinates data for the object. The controller generates a masking signal to obscure at least a portion of the object defined by the second display coordinates data.

According to another aspect, the present invention provides a method of video surveillance using a video display. A video signal is acquired with a zoomable camera. A first zoom setting is set for the camera to produce a first video image on the display from the video signal. A first blanking area data is generated and stored corresponding to the first blanking area. A second zoom setting is set for the camera to produce a second video image on the display from the video signal. The blanking area data is processed to generate a second blanking area data corresponding to a second blanking area. A mask object is displayed on the display over the second blanking area on the second video image.

According to still another aspect, the present invention provides a method of video surveillance using a video display and a camera. A set of object coordinates is stored for an object appearing in a first view. The camera is moved to a second view of the camera. The object coordinates are converted to display coordinates for the object appearing in the second view. A masking signal is generated. At least a portion of the object in the second view is obscured using the masking signal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As used herein, the term "window" shall refer to an area of view perceived on a display or monitor, or a corresponding portion of such display or monitor or raster coinciding with the area of view displayed therein, such view being rendered by the conversion of a video signal onto the display, monitor, or raster, as the case may be. The "window" may be user defined or programmed, or may be a result of a separate set of instructions or logic programmed or implemented on a particular system. The size, shape and orientation of the window may be variable or fixed, ranging from a rectangular area defined by two or more points or "vertices", to a many-sided polygon, to amorphous and non-simple two-dimensional surfaces. For these purposes, and as further used herein, a single "vertex" or many "vertices" shall refer to a discrete point(s) on a field of view represented and rendered on a display monitor or raster. A "vertex" may correspond for example, to a pair of horizontal and vertical coordinates fixed to the raster or display, or to a pair of spherical coordinates for a point in space, fixed relative to a pan and tilt camera.

Furthermore, as used herein, an "object" may refer to a window, or any physical article or item in view of a camera or displayed on a display, such that the term simultaneously refers to both the physical item itself and the virtual manifestation of such "object," this being the video signal and image of the object displayed on a display or monitor. As this invention is directed to video systems, the "object" is therefore generally simultaneously represented in both the real and image domains. A window may thus coincide with any object as it is displayed. The object, like the window, may have a number of vertices that define the object or its boundaries.

Also as used herein, the term "memory area" means a single or multiple physical memory element, or a portion of a single physical memory element. A "memory element" is in turn used herein to define any device capable of storing digital information.

Finally, as used herein, a "function" shall refer to a mathematical operation, combination, algorithm, or other process wherein a number of input variables are entered to produce a single output.

Figure 1:
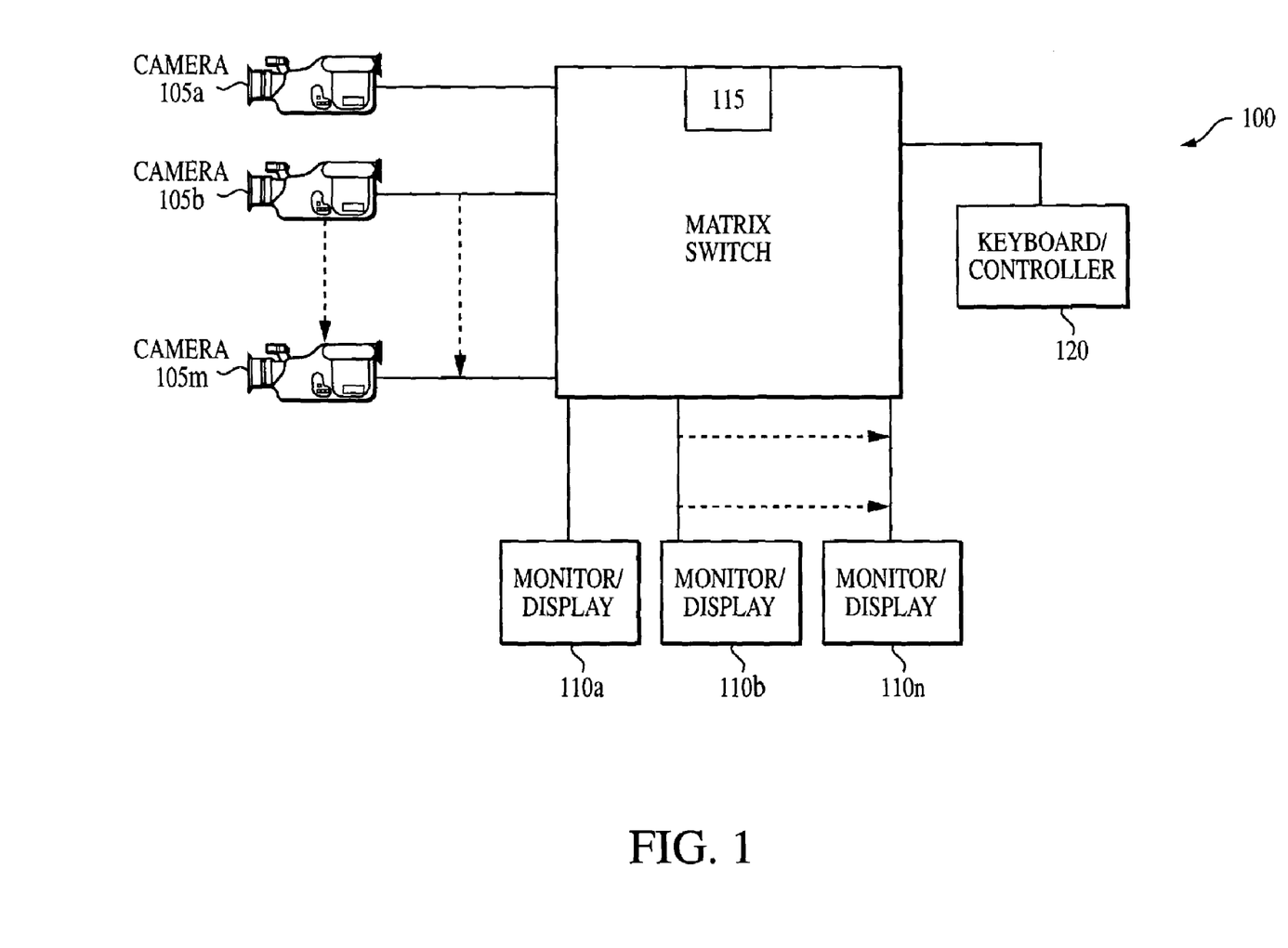
FIG. 1 is a block diagram of an exemplary multi-camera video surveillance system arranged in accordance with the principles of the present invention.

Referring now to the drawing figures, in which like reference designators refer to like elements, there is shown in FIG. 1 a block diagram of a video surveillance system, such as a closed circuit television (CCTV) system, for use in monitoring multiple scenes from multiple locations, constructed in accordance with the principles of the present invention and designated generally as 100. System 100 includes up to "m" video cameras 105a, 105b, through 105m, along with up to "n" video monitors or displays 110a, 110b, through 110n, (where "m" and "n" are whole numbers) coupled to a video switch, having at least one keyboard controller 120 connected thereto.

The cameras 105 may be any of a variety of video or still cameras, acquiring a picture using a lens, iris, zoom and focus controls, integrated optics package, or other image acquisition device. The cameras 105 may be included inside of a housing such a semi-hemispherical dome, suitable for affixation onto a surface. The housing may also include a set of orientational controls, such as pan and tilt motors and actuators for moving and orienting the direction of the image acquisition device. An example of such a camera 105 and housing is the SPECTRA series of video surveillance units manufactured by Pelco.

Each camera 105 is connected to the video switch 115, such as a multi-input and output "matrix" switch. The switch 115 contains a variety of components, including a computer and control circuit electronics for controlling the operation of each camera 105, through commands and codes received by the keyboard controller 120. Both the cameras 105 and keyboard controller 120 may be disposed at remote locations from the switch 115. The switch 115 is further connected to a number "n" of monitor displays 110. The "matrix" therefore, contains m×n channels for m camera inputs and n monitor outputs. One example of such a matrix switch is the CM 6800 switch manufactured by Pelco, which provides m=48 and n=8. The keyboard controller 120 is further used to control the appearance of the video signals on the monitors 110, such as the overall brightness, contrast, and the nature of the display of character text onto the images acquired by the cameras 105, as more fully described below.

Figure 2:
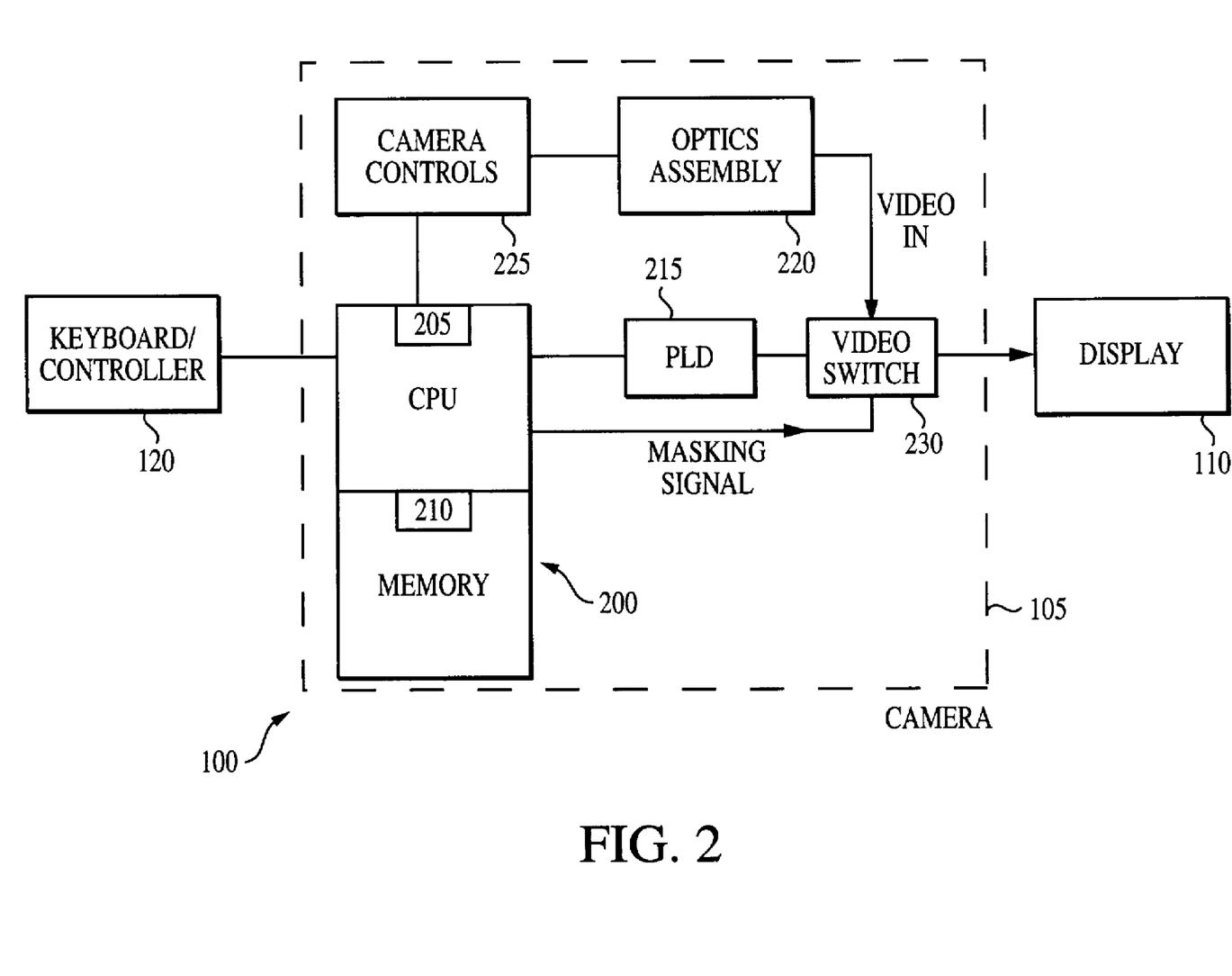
FIG. 2 is a block diagram of a camera assembly connected to a controller and display unit, showing the primary components of the camera's image acquisition and processing architecture.

FIG. 2 is a block diagram of a single camera assembly 105 connected to a controller 120 and display unit 110, showing the primary components of the camera's image acquisition and processing architecture. Camera 105 includes a microcontroller or computer 200, which further includes a microprocessor element or CPU 205 and a memory element 210, one or more separate programmable logic devices (PLDs) 215 coupled to the microcontroller 200. Camera 105 further includes an optics assembly 220 which includes a number of image acquisition components, such as a lens assembly, an iris, an imaging array, etc. Optics assembly 220 is further controlled by a set of mechanical camera controls 225, such as pan and tilt motors, or other suitable electromechanical components used for moving the optics assembly 220 over multiple degrees of freedom. Further included is a video switch 230 which receives the video signal output from the optics assembly 220 and either multiplexes or switches the signal with a masking signal generated by the microcontroller 200. The switch 230 may be controlled by logic generated by the microcontroller 200 itself or by a separate PLD 215 interposed therebetween. The output from the video switch 230 is displayed on the display unit 110 such as via a matrix switch 115 (not shown in FIG. 2).

CPU 205 may be any processing device or chip, microprocessor or microcontroller, such as a general purpose microcontroller like the 32-bit MMC2107 manufactured by Motorola. Memory 210 may be volatile or non-volatile, and include one or more memory elements, such as an electronically erasable programmable read-only memory (EEPROM), a random access memory (RAM), a flash memory, or a magnetic or optical memory drive. The memory element 210 may be further subdivided into a number of databases for holding data (as further described below), and for storing software, configuration data, programming, and other logic used by the microcontroller 200, the camera controls 225, optics assembly 220, video switch 230, or the entirety of the camera system 100. The PLD 215 may be any integrated circuit programmed to perform complex functions, and may include a programmable read-only memory (PROM), a programmable logic array (PLA), or programmable array logic/generic array logic (PAL/GAL). Examples of the PLD 215 implemented in one embodiment of the invention include any of the suitable devices manufactured by Altera Corporation.

The microcontroller 200 receives inputs and commands from a user operating the keyboard/controller 120 external to the camera assembly 105. The keyboard/controller 120 further includes a joystick or other manual device suitable for instructing the movement of the camera optics and motors to pan, tilt, zoom, and control the iris settings of the camera. All of these commands are processed by the microcontroller 200 inside the camera, with some external processing or preprocessing in the keyboard/controller 120 itself. Although not described herein, it is contemplated that one of ordinary skill in the art understands that keyboard/controller 120 generally generates signals to control other aspects of camera control/movement not listed herein. A software routine running on the microcontroller 200 controls the operation of the camera as well as the appearance of the video signal on the display 110, through the logic and commands generated by the microcontroller 200 and PLD 215. For purposes of description, this software, which may include a number of varying routines and subroutines, shall be denoted generally as the "camera software" and shall refer to any of the logic and commands executed by the microcontroller 200 as processed by the CPU 205 and using data, programming and instructions stored or entered in the memory 210. One particular function of the camera software is to generate video objects, such as menus, cursors, indicators, and masking and blanking objects, for display on the display 110, and manipulated by a user with keyboard/controller 120.

The present invention is a system and method of video surveillance using the camera system and architecture illustrated in FIGS. 1 and 2 and described above. The camera captures an image of a scene and produces a video signal, which is routed to the display unit 110 and is rendered on a monitor or any other suitable display device. Each image displayed on display unit 110 is a function of the particular camera settings, such as the orientation of the camera (its particular pan and tilt setting), the magnification or width of view (its particular zoom setting), and the extent of view (its particular iris setting). These variables, pan, tilt, and zoom, are therefore unique external variables which determine the nature of the image view portrayed on the display unit. Additional modifications would be necessary for translating camera systems, but this invention is nominally concerned with fixed camera systems, such as dome cameras, which have two or more rotational degrees of freedom.

The present invention provides a system and method for processing fields of view in video camera systems to track objects and obscure such objects from view, for a variety of camera pan, tilt and zoom settings. FIGS. 3A–3D are successive views of a camera image displayed on a display monitor at varying degrees of zoom or magnification. Each view is that of a video raster 300 on a display screen of a display unit 110.

Figure 3A:
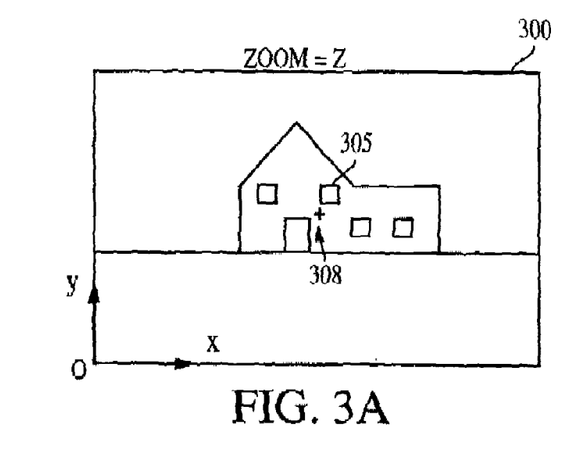
FIGS. 3A–3D are successive views of a camera image displayed on a display monitor at varying degrees of zoom or magnification.

FIG. 3A shows an object, such as a house in view at a zoom setting of z. The display itself may have a set of coordinate axes fixed at an origin O. The origin O is shown in this case as fixed to the lower left corner of the raster. The origin O may instead be fixed to any other point on the raster. The raster or display therefore may have a set of "display coordinates" (x, y), as shown in FIG. 3A. Here, the "x" coordinate refers to a horizontal position of a point on the display, relative to a reference point, and the "y" coordinate refers to a vertical position of a point on the display, relative to a reference point. The display coordinates determine the position of a point on the raster relative to a reference point, or origin O, fixed to the display. Furthermore, for any given display coordinates, a unique spatial position exists relative to a set of coordinates fixed to the camera. This spatial position is viewed on the display, but as part of a two-dimensional representation. However, for every object in view, a vertex or point on the object corresponds to a particular pan, tilt, and zoom setting of the camera, which in turn corresponds to the particular pan and tilt angles fixed relative to the camera, as well as a zoom setting. These "object" coordinates may be transformed to a corresponding set of display coordinates for any object in view. If the orientation of the camera changes (pan, tilt and/or zoom), both (i) the object coordinates change, and (ii) the particular position of the object viewed on the display, relative to the axes of the display, change as well.

A cursor 308, denoted by the "+" symbol on FIG. 3A, is generated by the camera software. In FIG. 3A, this position is shown as the center of the raster 300, but it may be at any point, as long as it is fixed relative to the raster. This cursor allows a user to select and enter both object and display coordinates for any point viewed on the display 300. The cursor is generally fixed to the display at a fixed set of display coordinates $(x^+, y^+)$. For example, if the object of interest is the upper right window object 305 of the house viewed in FIG. 3A, then the cursor 308 may be moved to each of the four vertices of such window object 305. The movement is achieved by the camera controls to actuate the camera orientation and zoom such that the cursor 308 is superimposed over the vertex in question. This is generally done using a joystick attached the keyboard/controller 120, or by a similar suitable control device. For each vertex of interest, both the display and object coordinates may then be saved to memory 210.

Figure 3B:
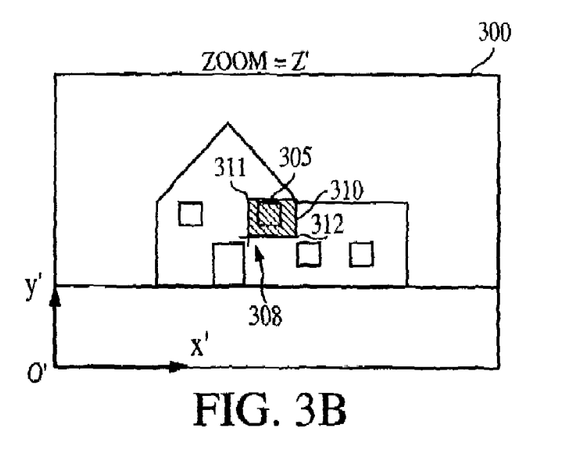
Figure 3C:
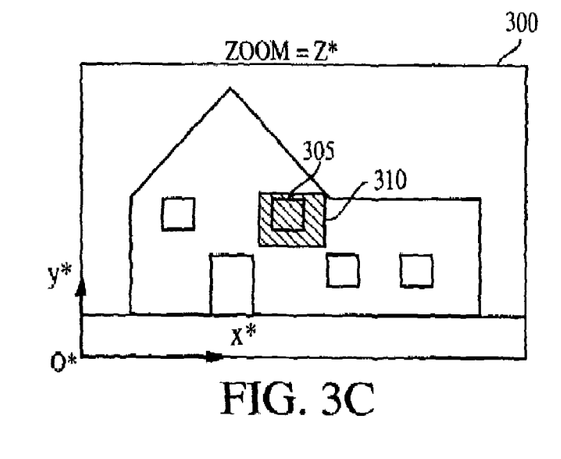
Figure 3D:
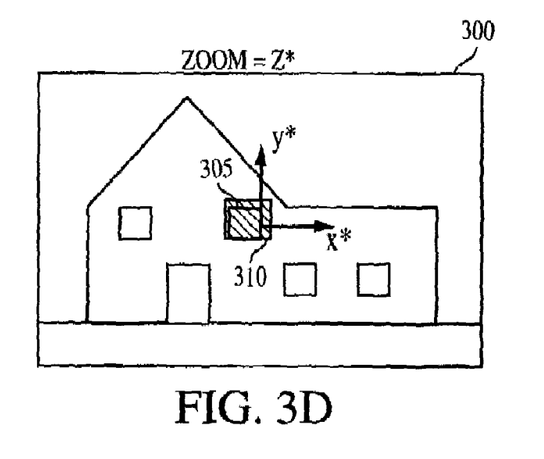

As the camera angle of view is tightened and the magnification of the lens in the camera optics is increased, the zoom of the camera increases to enlarge the objects in view, as shown in FIG. 3B. In FIG. 3B, the zoom setting has changed from z to z'. The display 300 now has a new set of display coordinates (x',y'). A still greater magnification or zoom to z=z* produces an even larger set of objects in view, as shown in FIG. 3C, where the display coordinates have changed yet again to (x*,y*). FIG. 3D shows the same raster 300 at the same zoom setting as FIG. 3C, but with a set of display coordinate axes (X*, Y*) fixed at the center of the raster.

The relationship between successive display coordinates depends on the relative changes in zoom settings (and pan and tilt if camera movement is involved). If, for example, both sets of coordinate axes for each of zoom settings z and z* were fixed to the center of the raster, then the display coordinates would be related by the corresponding zoom factor of magnification M=z*/z (where z*>z), such that x*=Mx and y*=My. This is a so-called "rectangular" model. This approximation of course assumes that no camera movement is involved, i.e. no pan or tilt of the optics is involved.

Referring again to FIG. 3B, to track or blank object 305, and the corresponding portion of the field view around such object is defined by a window 310 defined on the raster 300. This window 310 is defined by the user utilizing the camera controls and software as follows. The camera is actuated such that cursor 308 is overlaid at a point defining a first vertex of a window. For a rectangular window, the window may be defined either by two diagonally opposite vertices 311 and 312, or by all four corners. Non-rectangular windows may also be used, including four or more sided polygons having segments of varying length. In each case, the relevant vertices of the window object are defined by positioning the cursor on the point of the raster 300 such that it overlays the desired point on screen. Both the object and display coordinates of such a vertex are stored in memory 210. In the case of display coordinates, that which is stored is the set of relative values of (x',y') for that particular display coordinate scale. This scale is in turn correlated to the pan, tilt and zoom settings of the camera. However these very same pan, tilt and zoom settings are in turn stored as object coordinates for the vertex. In the case of display coordinates, this data defines the relative position of the vertex as viewed on the raster 300, for the display scale unique to such zoom setting. In the case of object coordinates, this data defines the relative position of the vertex with regard to the scene. Thus, for each window so defined, the display and object coordinates for each vertex are stored.

The zoom of the camera is thereafter increased to a different value, from z' to z*, as shown in FIG. 3C. As shown, the window defined in FIG. 3B is correspondingly bigger. The display scale is also correspondingly lower. The window stored in memory 210 is regenerated by recalculating the display coordinates of each of the windows coordinates. This calculation is done by converting to the new display coordinates (x*,y*) from the stored object coordinates, using the new zoom settings. Thus, where the camera does not move in pan or tilt, the coordinates of any given vertex on the (x*,y*) scale are a function of: x',y',z', and z*. Because the object coordinates are stored in memory, the window may be generated at any zoom setting desired.

Alternatively, as shown in FIG. 3D, the window may be programmed by the camera software to have fixed display coordinates, and never change as a function of zoom. However, this is generally not desired, since the present invention provides a system and method for blanking out objects in view for video surveillance applications. Thus, the window blanking tracks the object in view and grows or changes in shape as the object in view changes shape.

Furthermore, when the window 310 is initially specified, a zoom setting or zoom interval may be entered and stored in memory, such that the window 310 is only generated on the raster 300 for such particular zoom setting. As shown in FIG. 2, the microcontroller 200 produces a masking signal which contains the window object data to be mixed with the unprocessed video signal generated by the optics assembly 220. The video switch 230 is thus directed to mix the two signals before output to the display, wherein the masking signal may contain no windows for zoom settings outside the desired zoom settings, and vice versa.

The translation of display coordinates from one zoom setting to another works well when no camera movement is involved, but produces distorted images of windows and objects when the camera pan and tilt settings change from one view to another. This is because the transformation of one set of display coordinates (or display scale) to another, from (x',y') to (x*,y*), occurs purely using the former display coordinates and the zoom setting as inputs, when the aforementioned "rectangular model" is used. Under this model, the particular pan and tilt settings of the camera are not variables, since the model assumes a camera that is rotationally fixed. However, many video surveillance systems use moveable cameras, which, while fixed to a stationary point, are free to rotate about two axes to better survey a scene.

Another embodiment of the present invention, described below, corrects for such distortion, by using a set of spherical coordinates for each of the object coordinates, and by transforming the display coordinates for a particular view using not only the prior display coordinates and zoom settings, but the camera orientation data as well.

Figure 4:
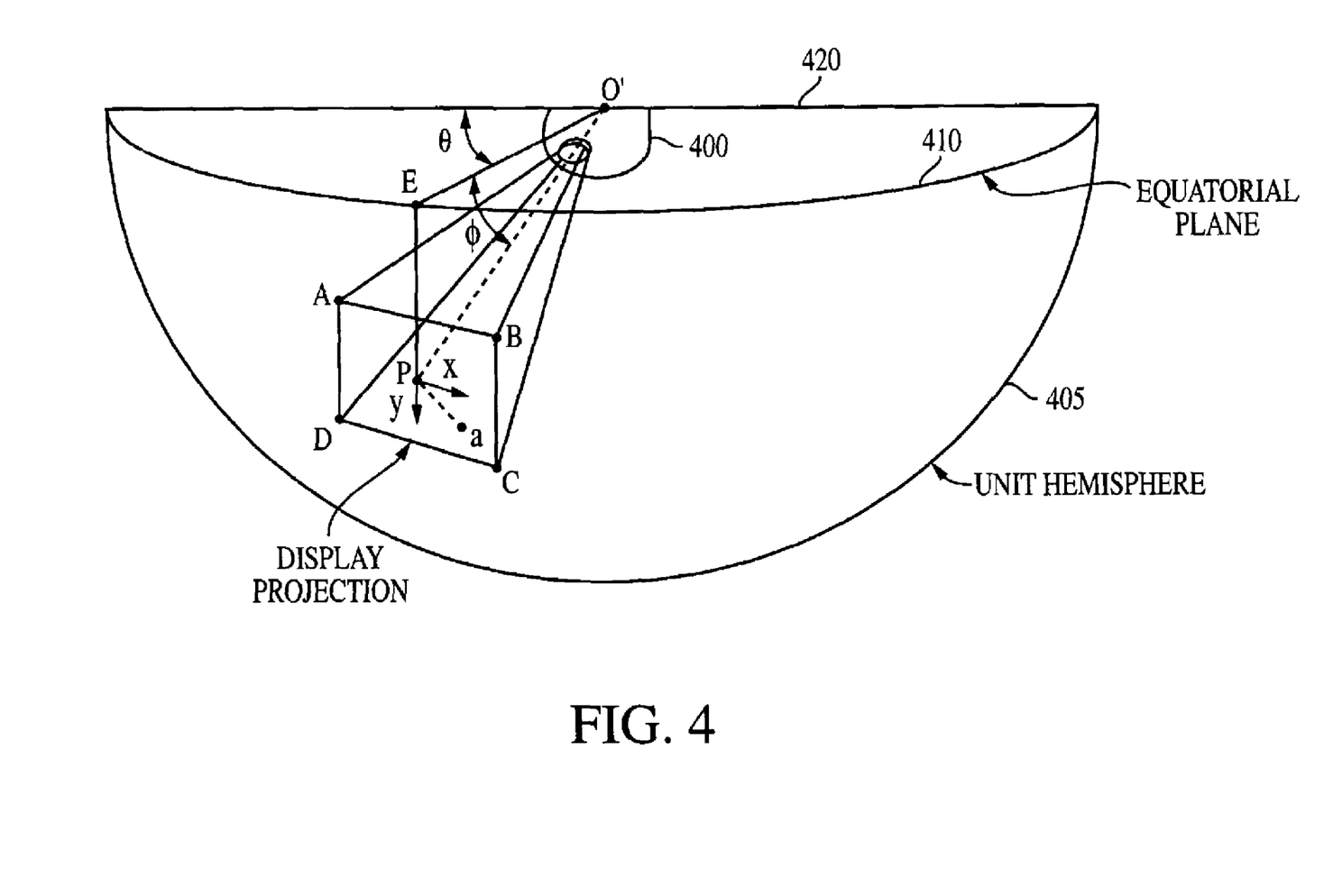
FIG. 4 is a schematic diagram of a pan and tilt camera view projected onto a unit hemispherical space around the camera.

Turning now to the figures, FIG. 4 is a schematic diagram of a pan and tilt camera view projected onto a unit hemispherical space around the camera. This representation illustrates the image pathways that lie in a camera's field of view. Camera 400 is fixed at a stationary point in an absolute reference frame, point O'. A unit hemisphere 405 envelops point O' as shown. Camera 400 is in this example a ceiling mounted dome camera, although the current model is applicable to any stationary camera. The unit hemisphere 405 is a portion of an imaginary spherical surface surround the camera at a nominal radius, in this case unity. The spherical surface may be more than a hemisphere if the camera's rotational degree of freedom extended to directions that span more than a hemisphere. However, most dome camera systems are free to move in rotational degrees of freedom spanning only a hemisphere, so this model is therefore used. It is understood however, that more than a hemisphere may be used, where appropriate.

The unit hemisphere is bounded by an equatorial plane 410 as shown. A reference line 420 spans a diameter of the equatorial plane as shown, and intersects the camera at O'. When the camera 400 is positioned to point to a point P on the unit hemisphere as shown, the view line O'P makes an angle φ with its projection O'E on the equatorial plane. This angle φ defines the tilt angle of the camera 400 and may also be referred to as the "latitude" of point P, or the "latitude" of the camera view. As shown on FIG. 4, the line EO' is the direction line for the pan position of the camera 400, such that the pan position may be measured out from the reference line 420 by angle θ as shown. This reference line 420 thus defines a "zero" line for the first rotational degree of freedom of the camera, that of its pan position, or its "longitude". The equatorial plane 410 defines the "zero" position for the second rotational degree of freedom for the camera, that of its tilt position, or its "longitude". In each case however, the "latitude" and "longitude" shall refer herein to either the camera orientation and/or the position of a point on the unit hemisphere directly in line with such an orientation. As such, the latitude and longitude will define a set of "object" coordinates for objects in the field of view of the camera, whereby the object's position in space will be directly related to the camera's orientation that affords a view of such a point in space.

As shown in FIG. 4, for a particular view of point P, the display will show an area around such a point, bounded by a rectangle ABCD as shown. It will appreciated that the invention described herein may be applicable to geometries other than purely rectangular. The display view ABCD is thus the projection of such a rectangular surface onto the unit hemisphere 405 as shown. The display coordinates (x,y) are analogous to a set of axes fixed to the display view, such as the center, coincident with point P as shown. For a general point "a" inside the display view, the display coordinates of such a point may then be measured. The size of the display view, and hence rectangle ABCD, relative to the unit hemisphere 405 is determined by the particular zoom setting for camera 400. For a wider zoom, at lower magnification, the display view ABCD will be a larger portion of the hemispherical surface, while for a tighter zoom, at higher magnification, the display view ABCD will be a smaller portion of the hemispherical surface.

Thus, to transform any point a on the display view ABCD from its display coordinates to its object coordinates, the camera orientation or "latitude and longitude" as well as the zoom setting must be used. As such, the functional relationship is as follows: $\{x,y\}_a \leftrightarrows \{\theta,\phi,z\}_{camera}$, where $\theta$ is the longitude, $\phi$ is the latitude, and z is the zoom setting. In this manner, for any point shown on a display view, the object coordinates of such point may be calculated.

Figure 5:
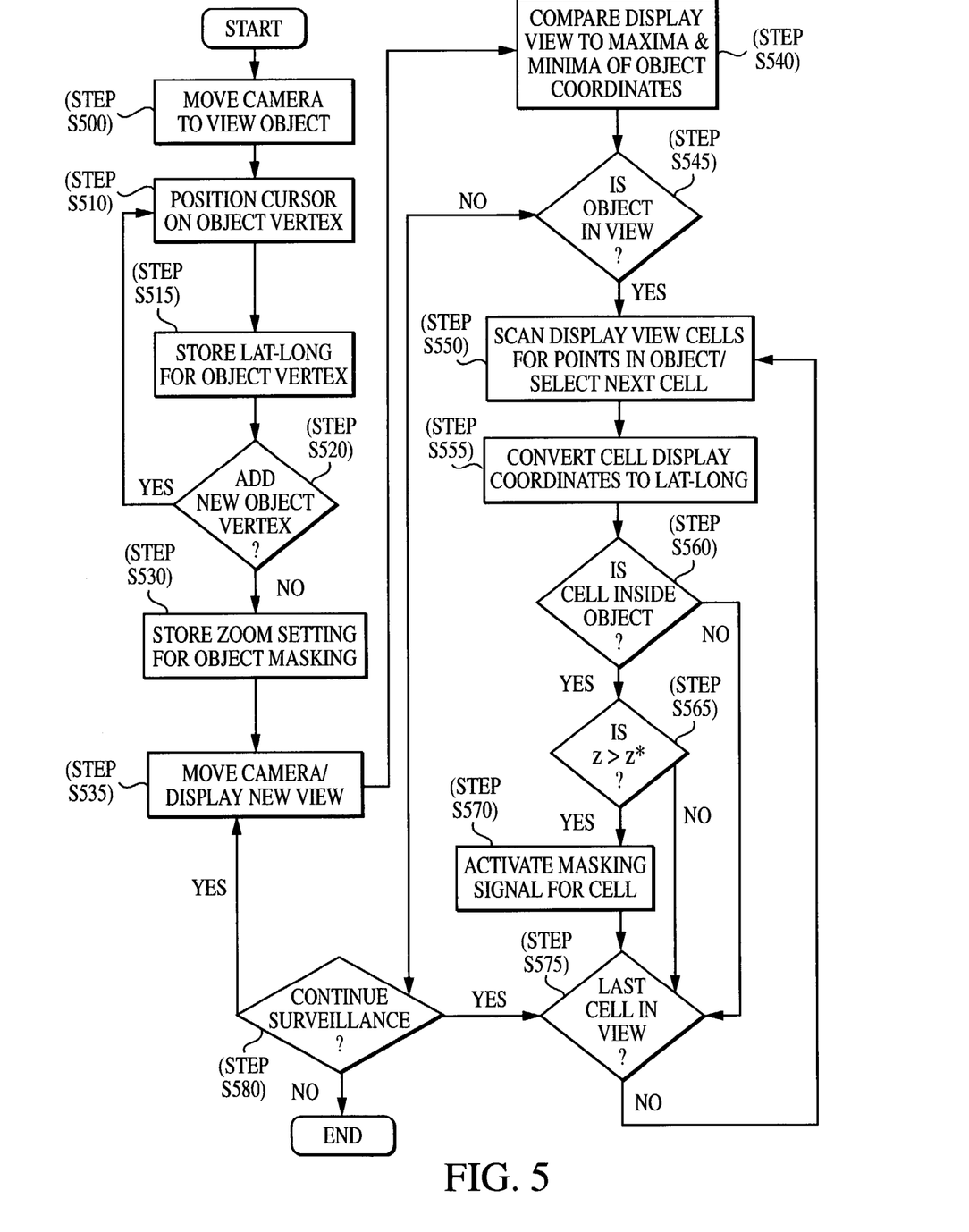
FIG. 5 is a flowchart of a process for tracking and blanking objects in the field of view of a surveillance camera.

These object coordinates are stored in memory element 200 in the camera 105, such that objects which come into view may be tracked, and then blocked from view, using a process described in the flowchart in FIG. 5.

The process includes two primary sub-processes. The first sub-process is directed to defining and storing the coordinates for objects within the surveillance scene (i.e. in potential view of the camera) which might need to be tracked and/or blanked. This first sub-process may be termed the "object selection" phase. The second sub-process entails the main surveillance method contemplated by the present invention, that of tracking and blanking objects in a scene as a camera moves. This second sub-process may be termed the "object tracking" phase.

Turning now to FIG. 5, and referring to the system components of FIG. 2, the overall surveillance process and the object selection phase commences at step S500, where the camera 105 is moved to a desired orientation and a particular latitude and longitude, or "lat-long." This orientation should show an object of interest on the display 110. The object of interest may generally be bounded by a multi-segment polygon, such as a simple triangle or square. Even if the object is not a simple polygon, it may generally be easily circumscribed by a simple polygon (such as a square around a round circular object). As such, each object will usually be approximated as a multi-segment polygon, with a corresponding set of vertices. Once the object of interest is placed in view, the object selection phase proceeds to store the coordinate data for each of the object's vertices.

In step S510, the camera is moved such that a cursor fixed in view on the display 110 is positioned coincident with a desired object vertex. In step S515, the camera longitude and latitude are stored in memory 210 for the object vertex. This is repeated for each object vertex via step S520 until all object vertices are stored in memory. Next, in step S530, a zoom setting is recorded for the object stored, whereby a masking window may be activated. The zoom setting may be a critical zoom value z*, above which masking may occur, or may include multiple zoom intervals, between which masking may be activated or deactivated and may be manually entered by the operator or automatically recorded based on the existing zoom setting. This completes the object selection sub-process for the overall process.

The process then enters the object tracking phase in step S535, whereby the camera is moved to a desired point and a new view is displayed. This new view may be any particular orientation and zoom $\{\theta,\phi,z\}_{camera}$. First, in step S540, the view extrema are compared to the maxima and minima of the object coordinates (for one or more objects) stored in memory 210. The view extrema are the four corners of the raster on the display 110. The display coordinates of such extrema, are converted to object coordinates or a latitude-longitude pair ("lat-long"), given the particular zoom setting of the camera as an input. A more detailed discussion of this conversion from display coordinates to object coordinates is provided below. This essentially transforms the four corners of the display to latitudes and longitudes of a virtual rectangular object projected on the unit hemisphere 405 of FIG. 4, as explained above. The lat-long of each display corner is compared to the lat-long of the object vertices in memory 210 by the microprocessor 200. If any object vertex is within the lat-long intervals of the display extrema, then the object is determined to be in view. If it is determined that no object is in view, then the process proceeds to step S580, wherein the camera surveillance may or may not continue.

Figure 6A:
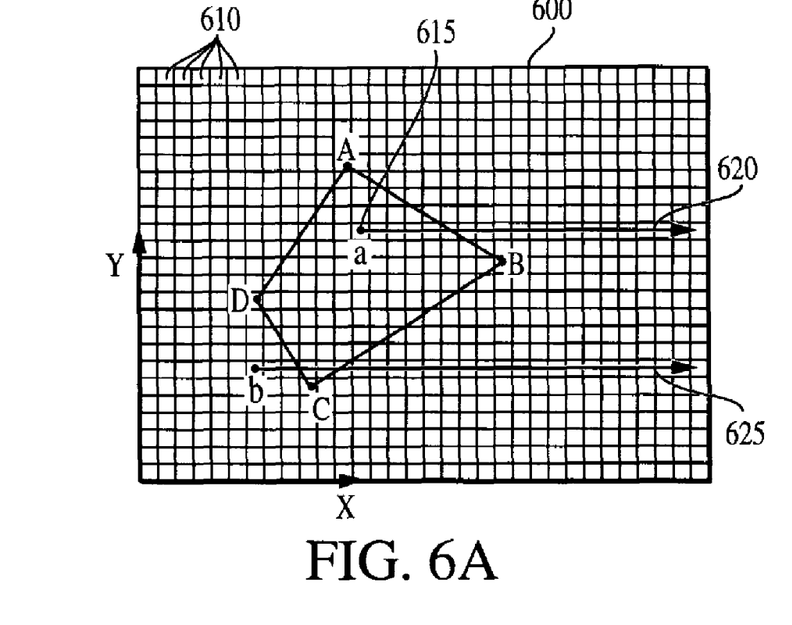
FIG. 6A is a view of an object in a camera view displayed on a monitor raster subdivided into a plurality of cells or pixels.

Once it is determined that the object is in view in step S545, the view is scanned by selecting the first of a number of "cells" into which the display is divided for that particular view. FIG. 6A is a view of an object in a camera view displayed on a monitor raster subdivided into a plurality of cells or pixels. Raster 600 is subdivided in a plurality of cells 610 as shown. In one exemplary embodiment of the present invention, the cells number 24 in the vertical direction and 32 in the horizontal direction, although any number of cells may be used. For a given cell 615 containing point "a," each such cell has a particular set of display coordinates (x,y). These display coordinates, combined with the particular zoom setting for the display view, may then translate to a particular set of object coordinates, or a lat-long for such cell.

Turning back to the process flow charted in FIG. 5, and referring to the components illustrated in FIG. 2, the display is scanned by the microprocessor 200 in a particular sequence, such as from the upper left most cell across and down successive rows of cells, selecting each next cell in succession, in step S550. In step S555, for each selected cell, the display coordinates of such cell, i.e. its relative horizontal and vertical position on the view, are combined with the zoom setting of the view and converted to lat-long coordinates.

Referring to FIG. 4, this conversion is accomplished as follows. First, for a given point a in the display, the point's position in the display is determined horizontally by a number of pixels, n_pix measured from a vertical edge and vertically by a number of lines n_line measured from a horizontal edge on the display. The total number of pixels and lines for the display are given by display widths, w_pix and w_line, respectively. Thus, the (x,y) display position for an arbitrary point a on the display is given by (n_pix/w_pix, n_line/w_line), for a set reference point as the origin, which is shown in FIG. 4 as point P. As shown in FIG. 4, longitude angles $\theta$ are measured from a fixed reference line 420 on the equatorial plane 410, while latitude angles ϕ are measured down from the equatorial plane. The longitude angle θ for the origin point is designated θ_p, while the latitude angle ϕ for the origin point is ϕ_p. The longitude angle q for the point a is designated θ_a, while the latitude angle ϕ for the origin point is ϕ_a.

Thus, for a given display position provided by (n_pix, n_line), the corresponding object coordinates are the latitude and longitude pair given by:

Latitude: ϕ_a=arcsin(cos(pix_angle)*sin(ϕ_p+line_angle)

Longitude: θ_a=θ_p+arctan(sin(pix_angle)/cos(pix_angle)*cos(ϕ_p+line_angle)

where pix_angle=((n_pix−w_pix/2)/w_pix)*FOV/mag line_angle=((n_line−w_pix/2)/w_line)*FOV/(AR*mag)

Here, "FOV" is a constant angle representing the field of view of the camera from side to side of the picture, as determined by the camera optics at minimum magnification (1×). "AR" is the constant aspect ratio of the display view, being the width of the view divided by the height of the view. For NTSC and PAL video standards, AR is 4:3. The zoom setting of the camera is given by the variable "mag," which is the relative magnification of a view from the maximum width or 1× view. The intermediate variables "pix_angle" and "line_angle" are horizontal and vertical angles, respectively, between point a and point P. Thus, in this fashion, display coordinates are converted to object coordinates, for a given point on a display view and a given zoom or magnification setting. There are areas where it is necessary to make an adjustment during calculation. This primarily occurs when the view overlaps the pole of the sphere (normal to the equatorial plane), that is when the camera is at or near vertical. In this case, the equations are still valid but must use the complementary angles to get correct results. To convert from (lat-long) to (x,y), for a given zoom, the conversion is performed using the inverse of the equations shown above.

Turning back to the process in FIG. 5, in step S560, the lat-long of each cell is compared to the lat-long of each object vertex for the object displayed in view, which is more fully explained below. In any case, if cell in question is determined to be inside the object, the process proceeds to determine, in step S565, whether the zoom setting of the camera view lies above a critical value z* (or in a critical zoom interval). If the cell is determined not to be inside the object in step S560, the microprocessor 200 checks whether the cell just examined is the last cell in view in step S575. If it is the last cell in view, then the process may continue to new surveillance positions, through step S580. If it is not the last cell in view, the microprocessor 200 proceeds back to step S550, selecting the next cell in view.

If in step S570, the zoom setting of the camera is above a critical level, then the PLD 215, as controlled by the microprocessor 200, generates instructions to apply a masking signal to the cell via video switch 230. The process then proceeds through steps S575 and either of steps S550 or S580 to either select the next cell in question, or proceed with additional surveillance and camera views, respectively. Once surveillance is desired to be terminated, the process ends.

Step S560 determines whether a particular cell in a display view is contained inside an object of interest in the view. As shown in FIG. 6A, for a given object ABCD, there may be two generalized cells "a" and "b," corresponding to points "a" and "b," respectively, and being inside and outside of the object ABCD, respectively. To determine whether a point (or cell) is inside the object, first a generalized right-pointing horizontal ray is taken for each point, such as ray 620 from point a, and ray 625 for point b. Each ray may be defined as a line extending towards a direction of zero change in latitude and continuous increasing longitude, where the rightwards direction has been referenced as the direction of positive longitude. The process then determines how many times such a ray intersects with any of the segments of object ABCD. For an odd number of intersections, the point is determined to be inside the object, whereas for an even number of intersections, the point is determined to be outside the object. As shown in FIG. 6A, for point a, which is inside object ABCD, the ray 620 only intersects the object ABCD once, through segment AB, this being an odd number of intersections. For point b, which is outside object ABCD, the ray 625 intersects object ABCD twice, through segments BC and CD, this being an even number of intersections. The microprocessor 200 is programmed to count the number of intersections by individually comparing whether a ray emanating from a point intersects any of each of the segments constituting an object.

To determine if a ray originating at a specific point of interest intersects a segment, first the endpoints of the segment are used to derive the general equation of a line. Since the latitude of the intersection point and the latitude of the point of interest must be the same (the ray being a line of zero change in latitude), this latitude is plugged into the equation for the line segment to derive the longitude value for the intersection point. This intersection longitude value is compared to the longitude value of the specific point of interest: if it is greater, then the ray intersects the line.

Thus, for point specific point "a," the microprocessor 200 first compares whether ray 620 intersects with segment AB, then with segment, BC, then segment CD, and finally segment DA. The number of intersections are tallied and analyzed and the determination is made whether or not the point is in the object.

Once the foregoing determination is made for every cell in a display, the PLD 215 instructs the video switch 230 to output either the raw video signal or a masking signal, for each cell. The video switch 230 therefore generates a composite signal which includes all of the cells for a display, wherein each cell displays an "image signal" for that cell, which is either the raw video signal for that cell received from the camera optics or a "blanking sub-window," as dictated by the masking signal for that cell received from the microcontroller 200. The "blanking sub-window" may be any cell-sized window that is different from the raw image video signal, such as a black or greyscale screen object or block, or as a "smear" object, as more fully discussed below. The final result is that a masking object or "blanking window" may be displayed over the object as in FIG. 6B, through the agglomeration of multiple masking or "blanking cells." In effect, each of the blanking cells themselves may be a discrete blanking window, the aggregation of which may be the larger complete blanking window that obscures the object. The entire process may then be repeated for each new camera view as the camera 105 is moved throughout a scene. Indeed, the entire process is repeated for each frame of video of the raw video signal, producing a composite signal, frame by frame. For each view, the display coordinates of the camera view are actively updated and converted to latitudes and longitudes, such that the objects stored in memory 210 may be actively blanked and tracked as the camera proceeds through its motion.

The blanking window and sub-windows may have a variety of forms, from a simple black or white or greyscale, to a pattern, or a combination of these. However, for certain video surveillance applications, it may be desired to allow some detail of a scene to be viewed while still masking another aspect of it. One embodiment of the present invention includes a system and method for allowing only movement to be viewed in a portion of a scene, while obscuring any additional detail.

Figure 6B:
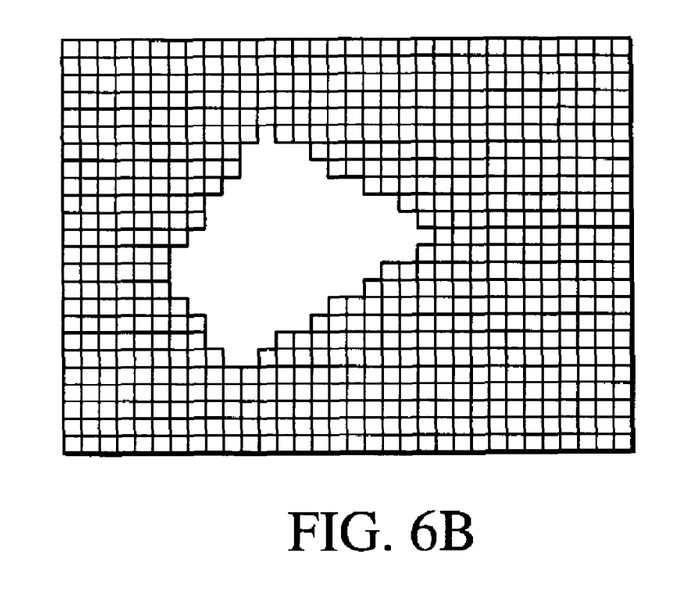
FIG. 6B is a view of the object and display raster of FIG. 5A with a bitmapped masking object superimposed.

This is accomplished by providing a circuit in the camera 105 that "smears" a video signal. In the previous embodiments, as shown in FIGS. 6A and 6B, the masking signal sent to a cell on a display 110 was a plain black signal, completely obscuring the field of view for that cell. As illustrated in FIG. 2, a masking signal sent from the microprocessor 200 is switched on or off for a particular cell in the display 110 by the switch 230, in response to commands received by the PLD 215. Another embodiment of the present invention provides for a so-called "smear circuit," which would alter each desired cell only to the point of obscuring minute detail, while allowing movement to be viewed.

Figure 7:
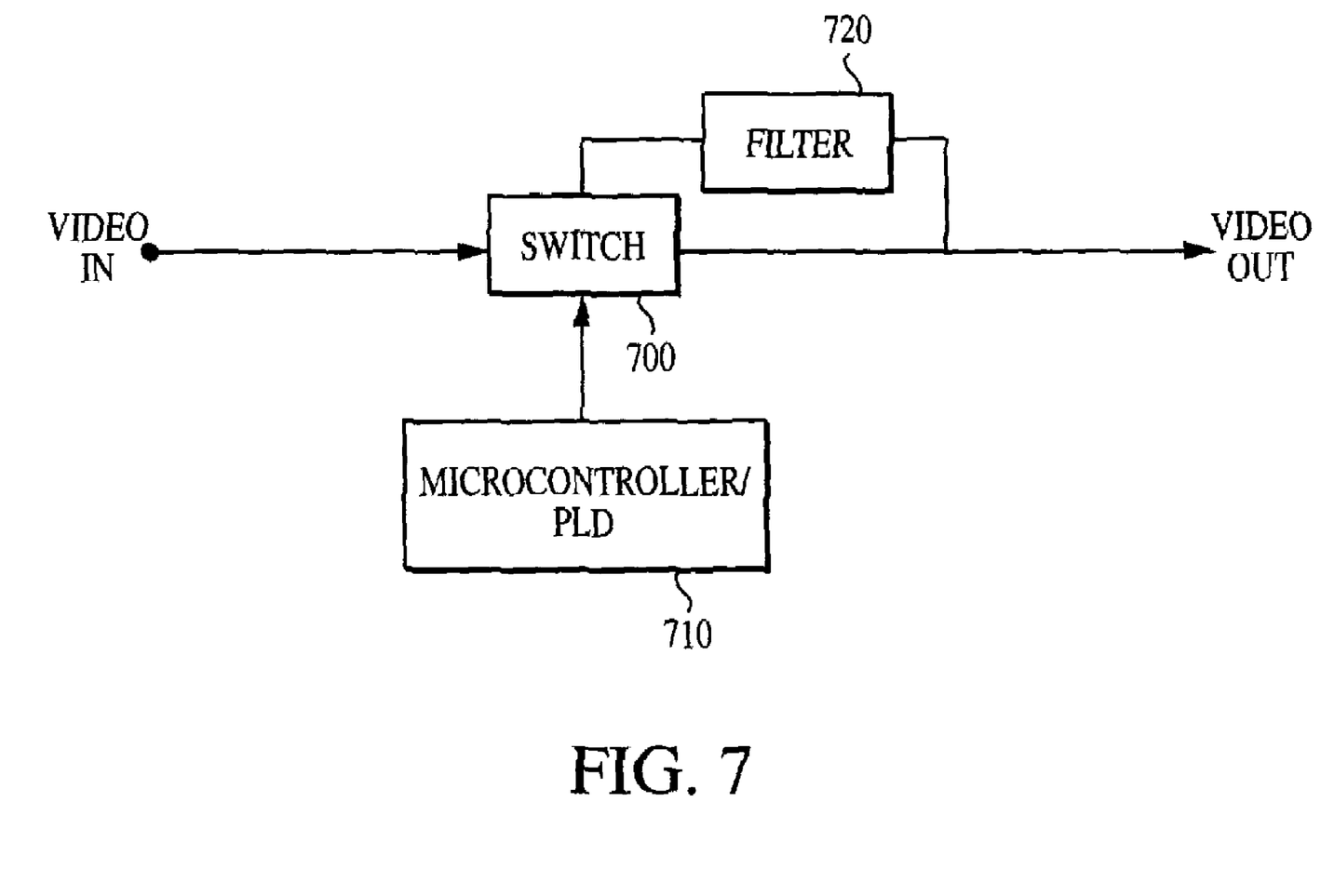
FIG. 7 is a block diagram of a smear circuit constructed in accordance with the principles of the present invention.

FIG. 7 is a block diagram of a smear circuit configured in accordance with the principles of the present invention. A video signal generated by the optics of the camera enters a switch 700, analogous to the switch 230 illustrated in FIG. 2. The timing of switch 700 is also controlled by a combination of a microcontroller and PLD 710, analogous to the microcontroller 200 and PLD 215 shown in FIG. 2. However switch 700 further includes a secondary output routed through a filter 720. Filter 720 may be an electronic analog filter, for a video signal that is analog, such as NTSC or PAL. Or, filter 720 may be a digital filter, using digital signal processing components to process a digital video signal.

To hide all detail except broad movement in a scene, the smear circuit illustrated in FIG. 7 effectively "smears" or blurs the image that is output. Filter 720 may be a lowpass filter which removes the high frequency components of a signal. This in effect removes the sharp edges of the picture passing through the filter. While the resolution is reduced, some detail, namely that of broad movements, is still visible through the smeared signal. In this way, only movement can be detected with an area of a scene, but specific details cannot be distinguished.

Thus, the embodiments of the present invention described hereinabove provide a system and method of video surveillance, where objects in view can be tracked and masked, particular fields of view can be masked or blurred, and the masking and tracking of such objects and fields may be controlled for specific zoom ranges, all while the camera continuously pans and tilts on two rotational axes. This greatly improves the video surveillance system's capacity to render certain areas of scene private, while also effectively applying windows and other screen objects on a display over objects within the view of the camera.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A video surveillance system for masking an object on a display, the video surveillance system comprising: a controller having: a memory, the memory storing a first display coordinates data for the object, and a processor electrically coupled to the memory, the processor converting the first display coordinates data to a second display coordinates data for the object, the controller generating a masking signal, to obscure at least a portion of the object, defined by the second display coordinates data; a camera operable to zoom in a magnification range to at least a first magnification and a second magnification greater than the first magnification, the camera generating a raw video signal; a switch electrically coupled to the camera, the switch receiving the raw video signal and the masking signal and generating a composite signal based on the raw video signal and the masking signal; a video display unit coupled to the switch for displaying the composite signal; and a programmable logic unit electrically coupled to the controller, the programmable logic unit controlling the switch to display the composite signal on the display unit, the composite signal comprising a plurality of frames, each frame having a plurality of cells, each cell displaying an image signal in response to the raw video signal and the masking signal, the first display coordinates data comprising a first horizontal display position, a first vertical display position, and the first magnification for each of a plurality of object vertices of the object, and the second display coordinates data comprises a second horizontal display position and a second vertical display position for each of the plurality of object vertices, wherein the processor calculates the second horizontal display position and second vertical display position of an object vertex based on the first display coordinates data and the second magnification and wherein each of the plurality of cells includes one or more blanking cells defining a blanking window having a plurality of blanking window vertices, and wherein the programmable logic unit is programmed to switch the masking signal on in only a portion of said magnification range, the masking signal generating a blanking sub-window as the image signal for each blanking cell.

2. A video surveillance system fir masking an object on a display, the video surveillance system comprising: a controller having: a memory, the memory storing a first display coordinates data for the object, and a processor electrically coupled to the memory, the processor converting the first display coordinates data to a second display coordinates data for the object, the controller generating a masking signal, to obscure at least a portion of the object, defined by the second display coordinates data; a camera operable to zoom in a magnification range to at least a first magnification and a second magnification greater than the first magnification, the camera generating a raw video signal; a switch electrically coupled to the camera, the switch receiving the raw video signal and the masking signal and generating a composite signal based on the raw video signal and the masking signal; a video display unit coupled to the switch for displaying the composite signal; and a programmable logic unit electrically coupled to the controller, the programmable logic unit controlling the switch to display the composite signal on the display unit, the composite signal comprising a plurality of frames, each frame having a plurality of cells, each cell displaying an image signal in response to the raw video signal and the masking signal, the first display coordinates data comprising a first horizontal display position, a first vertical display position, and the first magnification for each of a plurality of object vertices of the object, and the second display coordinates data comprises a second horizontal display position and a second vertical display position for each of the plurality of object vertices, wherein the processor calculates the second horizontal display position and second vertical display position of an object vertex based on the first display coordinates data and the second magnification and wherein each of the plurality of cells includes one or more blanking cells defining a blanking window having a plurality of blanking window vertices, and wherein the programmable logic unit is programmed to switch the masking signal on at the second magnification, the masking signal generating a blanking sub-window as the image signal for each blanking cell, a circuit coupled to the switch to produce a video signal for each blanking sub-window so that only movement can be viewed in each blanking sub-window.

3. A method of video surveillance using a video display and a camera, comprising:
storing a set of object coordinates fir an object appearing in a first view comprising setting the camera to a first zoom setting, moving the camera to point to a plurality of object vertices appearing in the first view of the camera, each object vertex having a vertex data including includes a camera pan position, camera tilt position, a latitude, a longitude, a first zoom setting, a horizontal display position, and a vertical display position, calculating the latitude and longitude of each vertex as a function of the camera pan position, the camera tilt position, the first zoom setting, the horizontal display position of the vertex, and the vertical display position of the vertex, storing the latitude, longitude, and zoom setting of each object vertex in a memory, wherein each object is defined by a polygon having a plurality of segments, each segment comprising two object vertices;
moving the camera to a second view comprising moving the camera to at least one of a second camera pan position and a second camera tilt position, setting the camera to a second zoom setting;
converting the object coordinates to display coordinates for the object appearing in the second view comprising calculating a second horizontal display position and second vertical display position for each object vertex as a function of the second camera pan position, the second camera tilt position, the latitude and the longitude of the vertex;
generating a video signal having a plurality of cells for each frame;
generating a masking signal comprising calculating a cell latitude and cell longitude for each cell, and comparing the cell latitude and cell longitude of each cell with the latitude and longitude of each object vertex to determine if the object is in the second view, and for each cell, counting the number of times a virtual ray, having a zero change in latitude and continuously extending in a positive or negative longitudinal direction from the cell, intersects with the plurality of segments to produce an intersection count for each cell; and
obscuring at least a portion of the object in the second view using the masking signal.

4. The video surveillance method of claim 3, further comprising: generating a blanking window having a plurality of blanking window vertices, the blanking window obscuring at least a portion of the object in the second view.

5. The video surveillance method of claim 4, wherein the plurality of blanking window vertices are equal in number to the plurality of object vertices, each of the blanking window vertices having a horizontal display position and a vertical display position substantially the same as the second horizontal display position and the second vertical display position, respectively, of one of the object vertices.

6. The method of claim 4, further comprising:
generating a blanking sub-window in response to the masking signal for each cell having an intersection count that is odd, the blanking sub-window replacing the cell in the composite video signal, the blanking window being defined by the blanking sub-windows.

7. The method of claim 6, wherein the blanking sub-window is generated by filtering the composite video signal with a lowpass filter.

8. The method of claim 3, wherein said step of generating a masking signal further comprises blanking a cell if the number of times counted in said counting step is an odd number.

9. A method of video surveillance using a video display and a camera, comprising:
storing a set of object coordinates for an object appearing in a first view comprising setting the camera to a first zoom setting, moving the camera to point to a plurality of object vertices appearing in the first view of the camera, each object vertex having a vertex data including includes a camera pan position, camera tilt position, a latitude, a longitude, a first zoom setting, a horizontal display position, and a vertical display position, calculating the latitude and longitude of each vertex as a function of the camera pan position, the camera tilt position, the first zoom setting, the horizontal display position of the vertex, and the vertical display position of the vertex, storing the latitude, longitude, and zoom setting of each object vertex in a memory, wherein each object is defined by a polygon having a plurality of segments, each segment comprising two object vertices;
moving the camera to a second view comprising moving the camera to at least one of a second camera pan position and a second camera tilt position, setting the camera to a second zoom setting;
converting the object coordinates to display coordinates for the object appearing in the second view comprising calculating a second horizontal display position and second vertical display position for each object vertex as a function of the second camera pan position, the second camera tilt position, the latitude and the longitude of the vertex;
generating a video signal having a plurality of cells for each frame;
generating a masking signal comprising calculating a cell latitude and cell longitude for each cell, and comparing the cell latitude and cell longitude of each cell with the latitude and longitude of each object vertex to determine if the object is in the second view, and for each cell, counting the number of times a virtual ray having a zero change in longitude and continuously extending in a positive or negative latitudinal direction from the cell intersects with the plurality of segments to produce an intersection count for each cell; and
obscuring at least a portion of the object in the second view using the masking signal.

10. The video surveillance method of claim 9, further comprising: generating a blanking window having a plurality of blanking window vertices, the blanking window obscuring at least a portion of the object in the second view.

11. The video surveillance method of claim 10, wherein the plurality of blanking window vertices are equal in number to the plurality of object vertices, each of the blanking window vertices having a horizontal display position and a vertical display position substantially the same as the second horizontal display position and the second vertical display position, respectively, of one of the object vertices.

12. The method of claim 10, further comprising:
generating a blanking sub-window in response to the masking signal for each cell having an intersection count that is odd, the blanking sub-window replacing the cell in the composite video signal, the blanking window being defined by the blanking sub-windows.

13. The method of claim 12, wherein the blanking sub-window is generated by filtering the composite video signal with a lowpass filter.

14. The method of claim 9, wherein said step of generating a masking signal further comprises blanking a cell if the number of times counted in said counting step is an odd number.

15. A video surveillance system for masking an object on a display, the video surveillance system comprising: a controller having: a memory, the memory storing a first display coordinates data fur the object, and a processor electrically coupled to the memory, the processor converting the first display coordinates data to a second display coordinates data for the object, the controller generating a masking signal, to obscure at least a portion of the object, defined by the second display coordinates data, wherein said second display has a plurality of cells and wherein said object is defined by a polygon having a plurality of segments, each segment comprising two object vertices and said controller further comprises generating a masking signal for each cell based on counting the number of times a virtual ray, having a zero change in latitude wad continuously extending in a positive or negative longitudinal direction from the cell, intersects with the plurality of segments to produce an intersection count for each cell.

16. The video system of claim 15, wherein said controller further comprises generating a masking signal for each cell if the number of time counted is an odd number.

17. A video surveillance system for masking an object on a display, the video surveillance system comprising: a controller having: a memory, the memory storing a first display coordinates data for the object, and a processor electrically coupled to the memory, the processor converting the first display coordinates data to a second display coordinates data for the object, the controller generating a masking signal, to obscure at least a portion of the object, defined by the second display coordinates data, wherein said second display has a plurality of cells and wherein said object is defined by a polygon having a plurality of segments, each segment comprising two object vertices and said controller further comprises generating a masking signal for each cell based on counting the number of times a virtual ray, having a zero change in longitude and continuously extending in a positive or negative latitudinal direction from the cell, intersects with the plurality of segments to produce an intersection count for each cell.

18. The video system of claim 17, wherein said controller further comprises generating a masking signal for each cell if the number of time counted is an odd number.

19. A method of video surveillance using a video display and a camera, comprising: storing a set of object coordinates for an object appearing in a first view, moving the camera to a second view, converting the object coordinates to display coordinates for the object appearing in the second view, generating a masking signal, obscuring at least a portion of the object in the second view using the masking signal, wherein said obscuring step comprises obscuring at least a portion of the object in the second view using the masking signal so that only movement can be viewed in the obscured portion of the object in the second view.

20. The method of claim 19, wherein said generating step comprises using a lowpass filter.

21. The method of claim 19, wherein said obscuring step comprises obscuring at least a portion of the object in the second view using the masking signal when the camera is zoomed to a magnification that is within a range of magnifications.

* * * * *